Jan. 10, 1956 — F. E. KUEHNE, JR — 2,730,385

SOLDERED ELBOW

Filed March 22, 1952

INVENTOR:
FRED KUEHNE, JR.
BY
ATT'YS

United States Patent Office 2,730,385
Patented Jan. 10, 1956

2,730,385
SOLDERED ELBOW

Fred Kuehne, Jr., Mattoon, Ill., assignor to Kuehne Manufacturing Co., Mattoon, Ill., a corporation of Illinois Application March 22, 1952, Serial No. 278,020

2 Claims. (Cl. 285—211)

This invention relates to angle joints in structures made of metal tubing and has particular reference to joints in which the parts are connected integrally by means of hard or soft solders.

The main objects of this invention are to provide an improved structure for soldered angle joints in metal tubing; and to provide an improved method of reinforcing such joints with a minimum use of material.

A specific embodiment of this invention is shown in the accompanying drawings in which.

Figure 3:
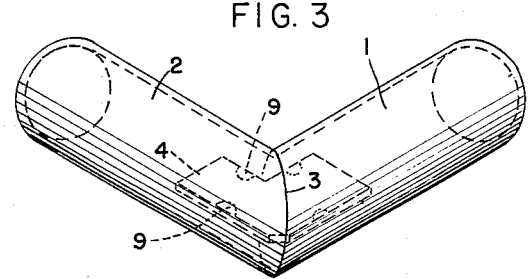
Fig. 3 is a perspective view corresponding to Fig. 1, but with the parts assembled ready for soldering to complete the joint.
Figure 4:
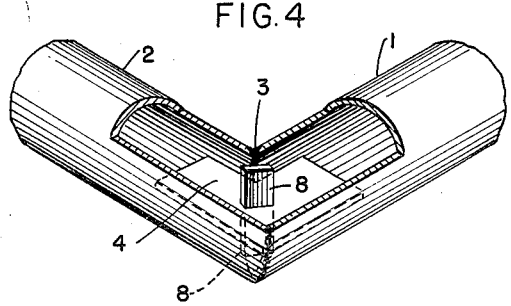
Fig. 4 is a view corresponding to Fig. 3 with a modified form of reinforcement, the walls of the tubular members being shown partly broken away to clearly illustrate the structure.

In the form shown, the tubular members 1 and 2 that are to be connected at an angle to each other have their end surfaces 3 cut on a planar bevel so that they can be fitted together with their wall end contours in registry, as shown in Figs. 3 and 4.

The joint is reinforced by a planar insert 4 that has arms 5 disposed at the same angle to each other as that of the axes of the tubes 1 and 2 in the finished joint. The longitudinal edges 6 and 7 of these arms are parallel and width of the arms is exactly that of the internal diameter of the tubular members. When the tubes 1 and 2 are brought together on the arms of the insert and in the relative positions in which the contours of their beveled surfaces 3 will register with each other throughout the entire contour thereof, then the insert will lie exactly in the plane of the axes of the tubular members 1 and 2. If the tubes are cylindrical, their beveled end contours will be elliptical and the plane of the insert will lie in the major axes of such elliptical contours. This is apparent in Fig. 2.

Figure 1:
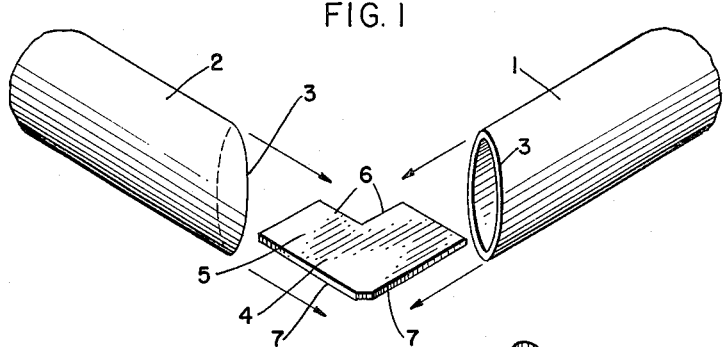
Figure 1 is an exploded perspective view showing the individual parts of the joint and indicating the manner in which they are brought together preparatory to soldering the joint.
Figure 2:
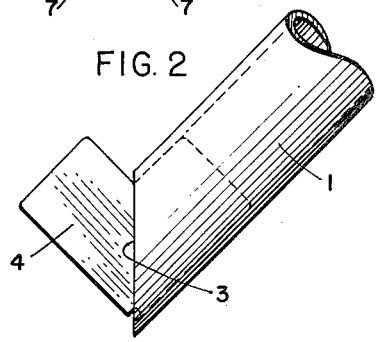
Fig. 2 is a projection taken at right angles to the plane of the axes of the tubular members illustrating the first step of securing the reinforcing insert into one of these members.

In the form shown in Fig. 4, the insert 4 is like that of Figs. 1 to 3, but is perforated and has extending therethrough a bar of metal transverse to the plane of part 4 to provide lugs 8 of such length as to meet the joint at the inside wall surfaces of the members 1 and 2 at points located midway between the points where those walls meet the corners defined respectively by the edges 6 and 7.

On assembling the parts, the insert 4 is first inserted into the tube 1 exactly in the plane defined by the axis of the tube 1 and the major axis of the ellipse of the beveled end 3 of the part 1. For this purpose, the arm 5 may have a driving fit with the inner walls of the tube 1 so that it will remain in place while the tube 2 is slipped over the other arm 5 to bring the beveled surfaces of the tubes into registry with each other.

Particles of solder, as indicated at 9 in Fig. 3, are laid on the top of the insert 4 during the assembling operation so that when the parts are heated in the act of soldering the joint between the abutting end surfaces 3, these masses of solder 9 will flow over the edges of the insert for securing it.

Although but one specific embodiment of this invention is herein shown and described, it will be understood that numerous details of the structure shown may be altered or omitted without departing from the spirit of the invention as defined by the following claims.

I claim:

1. An angle joint for tubes comprising, a pair of tubular members of circular cross section disposed at an angle to each other and having beveled ends shaped for mutually registering circumferential abutment and being soldered together at said ends, a reinforcing insert in the form of a relatively thin flat plate having arms disposed at an angle to each other lying in the plane of the axes of said members with the longitudinal marginal edges of the plate abutting along and soldered to the inner walls of said member, and lugs on said insert plate inwardly of its perimeter extending transverse to such axial plane and bearing against said inner walls of the tubes adjacent said bevelled ends.

2. An angle joint for tubes comprising, a pair of tubular members of circular cross section disposed at an angle to each other and having beveled ends shaped for mutually registering circumferential abutment and being soldered together at said ends, a reinforcing insert in the form of a relatively thin flat plate having arms disposed at an angle to each other lying in the plane of the axes of said members with the longitudinal marginal edges of the plate abutting along and soldered to the inner walls of said member, said insert having a perforation therein inwardly of its perimeter in the plane of said beveled ends, and a bar extending through said perforation and bearing against the walls of both said tubular members at opposite points substantially midway between the edges of said insert.

References Cited in the file of this patent

UNITED STATES PATENTS

| 231,262 | Bowker | Aug. 17, 1880 |
| 958,316 | Rogers et al. | May 17, 1910 |
| 1,734,710 | Borchert | Nov. 5, 1929 |
| 1,773,731 | Haskell | Aug. 26, 1930 |
| 2,101,349 | Sharp | Dec. 7, 1937 |

FOREIGN PATENTS

| 14,445 | Great Britain | Aug. 10, 1892 |
| 562,227 | Germany | Oct. 22, 1932 |
| 777,911 | France | Dec. 15, 1934 |